(12) United States Patent
Evoy et al.

(10) Patent No.: US 6,766,460 B1
(45) Date of Patent: Jul. 20, 2004

(54) SYSTEM AND METHOD FOR POWER MANAGEMENT IN A JAVA ACCELERATOR ENVIRONMENT

(75) Inventors: David R. Evoy, Tempe, AZ (US); Lonnie C. Goff, Tempe, AZ (US); Bonnie Sexton, Cary, NC (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 572 days.

(21) Appl. No.: 09/645,468

(22) Filed: Aug. 23, 2000

(51) Int. Cl.[7] ............................................. G06F 1/28
(52) U.S. Cl. ........................................ 713/323; 713/324
(58) Field of Search ................................ 713/300, 310, 713/320, 322, 323, 324

(56) References Cited

U.S. PATENT DOCUMENTS

| | | | |
|---|---|---|---|
| 5,251,320 A | * 10/1993 | Kuzawinski et al. | ........ 713/324 |
| 5,517,649 A | * 5/1996 | McLean | ..................... 713/323 |
| 5,953,741 A | 9/1999 | Evoy et al. | |
| 5,983,340 A | 11/1999 | Garey et al. | |
| 5,991,863 A | 11/1999 | Dao et al. | |
| 5,995,747 A | 11/1999 | Guttag et al. | |
| 6,009,505 A | 12/1999 | Thayer et al. | |
| 6,026,484 A | 2/2000 | Golston | |
| 6,026,485 A | 2/2000 | O'Connor et al. | |
| 6,035,408 A | * 3/2000 | Huang | ........................ 713/320 |
| 6,240,521 B1 | * 5/2001 | Barber et al. | ................ 713/323 |
| 6,314,515 B1 | * 11/2001 | Miller et al. | .................... 713/1 |
| 6,330,659 B1 | * 12/2001 | Poff et al. | ...................... 712/34 |
| 6,341,354 B1 | * 1/2002 | Lee | ............................. 713/324 |
| 6,351,823 B1 | * 2/2002 | Mayer et al. | ................. 714/10 |
| 6,507,946 B2 | * 1/2003 | Alexander et al. | .......... 717/145 |
| 6,519,707 B2 | * 2/2003 | Clark et al. | ................. 713/322 |

FOREIGN PATENT DOCUMENTS

| | | | | |
|---|---|---|---|---|
| JP | WO0002118 | | 1/2000 | |
| JP | 2000194668 A | * | 7/2000 | ........... G06F/15/16 |

OTHER PUBLICATIONS

El-Kharashi et al.—"Java Microprocessors: Computer Architecture Implications"—1997 IEEE Pacific Rim Conference on Aug. 20–22, 1997, vol. 1, Page(s): 277–280.*

* cited by examiner

*Primary Examiner*—Thomas Lee
*Assistant Examiner*—Thuan Du
(74) *Attorney, Agent, or Firm*—Michael J. Ure

(57) ABSTRACT

A power management method is disclosed which provides power management for a hardware based Java accelerator. Initially, a Java mode signal is provided from a host processor in response to initiating a Java application. Thereafter, power to the host processor is reduced, and power to a Java processor is increased in response to the Java mode signal. Then, when execution of the Java application halts, a Java completion signal is generated from the Java processor, thus signaling the system to return control back to the host processor.

20 Claims, 5 Drawing Sheets

SYSTEM AND METHOD FOR POWER MANAGEMENT IN A JAVA ACCELERATOR ENVIRONMENT

CROSS REFERENCE TO RELATED APPLICATIONS

This application is related to U.S. patent application Ser. No. 09/565,679, still pending, filed on May 4, 2000, entitled. "ARCHITECTURE FOR AN INTEGRATED SUBSYSTEM HAVING A JAVA STACK, ARITHMETIC LOGIC UNIT AND MULTIPLE STACKPOINTERS AND METHODS FOR USING THE SAME," which is hereby incorporated by reference in its entirety.

This application is also related to U.S. patent application Ser. No. 09/670,496, still pending, filed on Sep. 26, 2000 entitled "SYSTEM AND METHOD FOR LOW OVERHEAD BOUNDARY CHECKING OF JAVA ARRAYS," which is hereby incorporated by reference in its entirety.

BACKGROUND OF THE INVENTION

1. Field of the Invention

This invention relates generally to hardware accelerated Java execution, and more particularly to power management within a master/slave Java accelerator environment.

2. Description of the Related Art

Today's world of computer programming offers many high-level programming languages. Java, for example, has achieved widespread use in a relatively short period of time and is largely attributed with the ubiquitous success of the Internet. The popularity of Java is due, at least in part, to its platform independence, object orientation and dynamic nature. In addition, Java removes many of the tedious and error-prone tasks which must be performed by an application programmer, including memory management and cross-platform porting. In this manner, the Java programmer can better focus on design and functionality issues.

To execute a Java application a Java processor is used, which is typically realized only by software in form of a Java Virtual Machine (JVM). However, because of the problems associated with implementing a process in software, the JVM is plagued with slow performance issues.

Conventionally two techniques have been used to improve performance of Java interpretation, namely native Java execution, and partial hardware interpretation of Java instructions. The native Java execution approach uses hardware to build a real Java processor. However, this technique presents a severe flaw in that it removes the Java concept of the 'outside machine,' and therefore eliminates a large amount of software, which is not capable of executing on such a Java processor.

The partial hardware interpretation of Java instructions approach uses hardware assist to improve the interpretive process. This configuration is often called a Java accelerator. Essentially, it approximates the performance of an assembly language interpreter executing out of zero wait state memory.

One implementation of the Java accelerator uses a master/slave configuration wherein the master (host) processor executes all instructions other than Java instructions, and the slave processor executes exclusively Java instructions. However, conventional systems using this approach have been fraught with problems associated with power management between the host and the slave processors. This problem is exasperated when both processors are implemented on small, battery powered, mobile devices, where power conservation is very important.

Historically, problems associated with the power management of computing devices resulted from attempts to detect when a system, or various component parts within a system, is performing meaningful work. Often, conventional power management systems monitor input and output (I/O) signals in conjunction with idle timers to detect when power to devices can be shut off.

In other conventional power management systems, the frequency of the processor interface is varied, thereby lowering the power consumption of the computer system. Still other conventional power management systems use a method called clock throttling to lower the power consumption of the microprocessor and hence the power consumption of the computer system. Under this method, when a microprocessor is deemed not to be doing meaningful work, an input to the microprocessor is changed which effectively tells the microprocessor to stop using its clock internally. By changing the input to the microprocessor, the microprocessor is slowly throttled back so that the microprocessor will not burn as much energy thereby reducing the power consumption of the computer system. Although recent prior art power management decision processes have been improved by making them operating system (OS) centric, most conventional power management decisions are only guesses.

While the above methods may result in a reduction of power consumption, none of the methods are combined with a reduction in the operating voltages of each processor in the system, which would further reduce power consumption in the system. Controlling both the operating voltages and operating frequencies of both the host and Java processor would allow for optimal power and performance tradeoffs in the computer system.

In view of the forgoing, there is a need for systems and methods that provide improved power management within a Java accelerator. The power management systems should control both the operating voltages and operating frequencies of the host and Java processor. Moreover, the power management system should ensure that neither the power supply nor the digital circuitry is stressed during operating condition changes, and should ensure adequate time is available between operating condition changes to allow for memory updates between processors.

SUMMARY OF THE INVENTION

Broadly speaking, the present invention fills these needs by providing an improved power management system for a Java accelerator. The power management system of the present invention controls both the operating voltages and operating frequencies of the host and Java processor, thus allowing for optimal power and performance in the computer system. In one embodiment, a power management method which provides power management for a hardware based Java accelerator is disclosed. Initially, a Java mode signal is provided from a host processor in response to initiating a Java application. Thereafter, power to the host processor is reduced, and power to a Java processor is increased in response to the Java mode signal. Then, when execution of the Java application halts, a Java completion signal is generated from the Java processor, thus signaling the system to return control back to the host processor.

In another embodiment, a power management system which provides power management for a hardware based Java accelerator is disclosed. The power management system includes a host processor coupled to power generation circuitry. The host processor includes a Java mode signal port capable of providing a Java mode signal. Further included in the power management system is a Java processor, which is also coupled to the power generation circuitry. The Java processor includes a Java completion signal port, which is capable of providing the Java completion signal. In use, the power generator circuitry reduces power to the host processor, and increases power to the Java processor in response to receiving the Java mode signal. Further, in response to receiving the Java completion signal, the power generator circuitry increases power to the host processor and reduces power to the Java processor.

A ramp circuit method for dampening changes provided to a processor is disclosed in yet a further embodiment of the present invention. The ramp circuit method begins by obtaining a target value that represents a desired frequency or voltage that the processor is to be set at. Then, the target value is compared to a current value to obtain a difference value. Similar to target value, the current value is a current frequency or voltage that the processor is currently operating at. The current value is then adjusted when the difference value is outside a predefined threshold value, which can be a range of values, or a single value, such as zero. The above operations are then repeated until the difference value is within the predefined threshold value.

Advantageously, the present invention allows for optimal power and performance in the computer system by controlling both the operating frequencies and operating voltages of the host and Java processor. Furthermore, when both the frequency and voltage are controlled, the voltage is increased prior to increasing the frequency, and the frequency is decreased prior to decreasing the voltage. This assures that the system does not run at a frequency that is too fast for the current voltage, thus resulting in further power savings.

Finally, it will become apparent to those skilled in the art that the power management system of the present invention ensures adequate time is available between operating condition changes to allow for memory updates between processors. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a power management system for a Java accelerator. Broadly speaking, the power management system of the present invention manages power usage in a Java accelerator by reducing power to a host processor and increasing power to a Java processor when a Java application is initiated, and reversing the process when execution of the Java application is halted.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
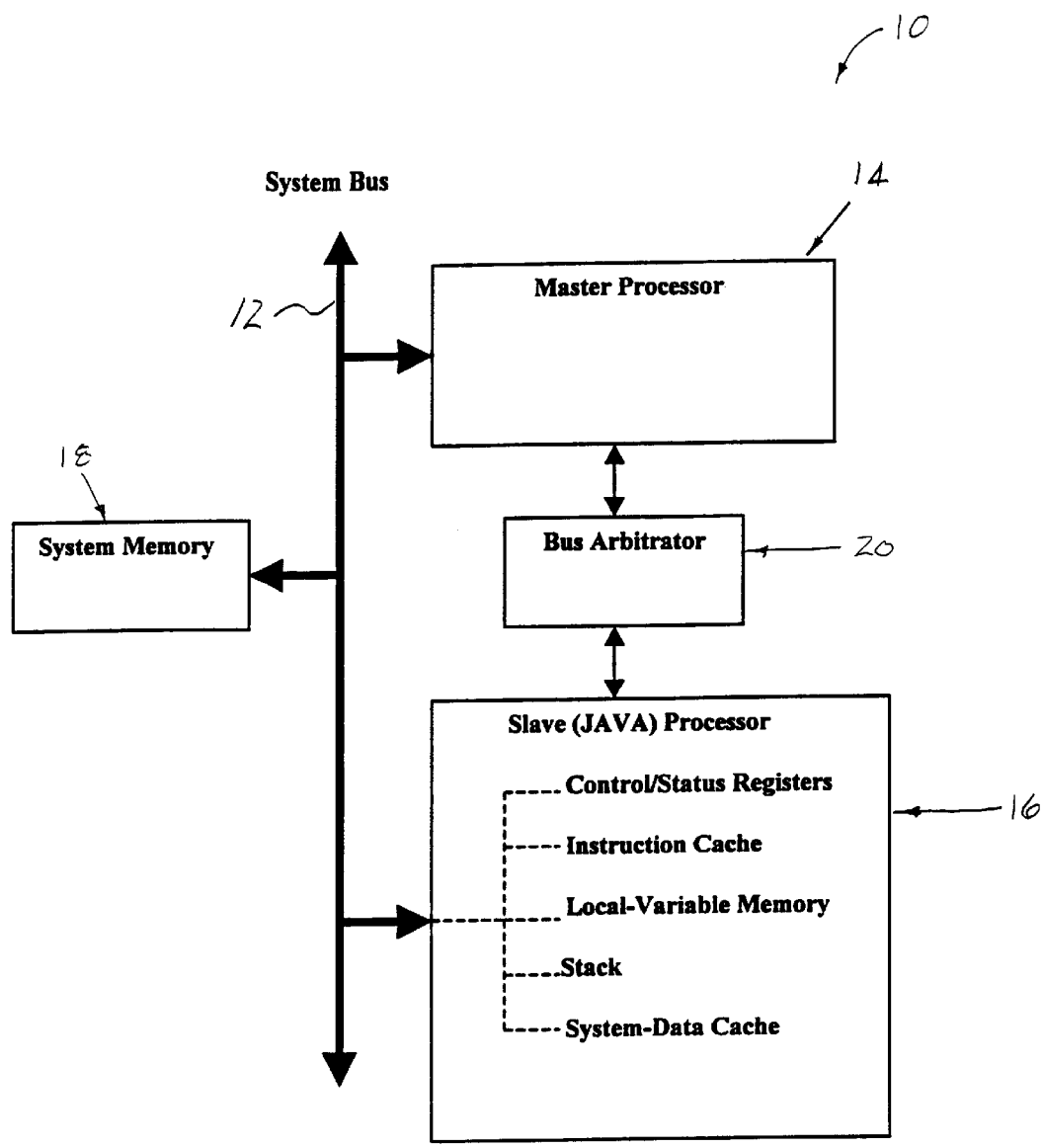
FIG. 1 is a block diagram showing a Java hardware accelerator system in accordance with an embodiment of the present invention.

FIG. 1 is a block diagram showing a Java hardware accelerator system 10 in accordance with an embodiment of the present invention. The Java hardware accelerator system 10 includes system bus 12 coupling a master (host) processor 14, a slave (Java) processor 16, and a system memory 18. In addition, the Java hardware accelerator system 10 includes a bus arbitrator 20 coupled between the host processor 14 and the Java processor 16.

The Java hardware accelerator system 10 is a dual processor system wherein the Java processor 16 executes most Java instructions, and the host processor 14 executes all remaining instructions, including complex Java instructions. As is inherent to the Java paradigm of a "machine within a machine," the Java processor 16 is a slave processor. Acting as the "inside machine," the Java processor 16 is initiated and controlled by the "outside machine," which is the host processor 14.

The host processor 14 can be embodied in any processor, including current industry standard devices, such as x86, ARM, and MIPS devices. The Java processor 16 is preferably a stack-based processor that includes instruction and data caching, and internal SRAM. In addition, the Java processor 16 preferably includes a register-based stack, as described in related U.S. patent application Ser. No. 09/565, 679 entitled "ARCHITECTURE FOR AN INTEGRATED SUBSYSTEM HAVING A JAVA STACK, ARITHMETIC LOGIC UNIT AND MULTIPLE STACKPOINTERS AND METHODS FOR USING THE SAME," still pending which is hereby incorporated by reference in its entirety.

Generally, the host processor 14 supports the operating system, non-Java applications, and complex Java instructions. In one embodiment, an additional dedicated ARM, or equivalent, processor (not shown) is used to handle the complex Java instructions.

The Java processor 16 is generally at least capable of executing the following Java instructions: Loads, Stores, Computation, Branch, Push, and Field. Preferably, support for all computation instructions, both integer and floating point, is built into the Java processor 16. As stated previously, the host processor 14 handles the more complex instructions, such as method calls. The Java processor 16 generates an exception when a complex instruction is decoded, and all dirty lines in the data cache are written to the system memory 18. Thereafter, the Java processor 16 halts execution.

Preferably, the Java processor 16 includes an instruction cache for fast access to the methods being currently executed. Local data being used to support the methods resides in the internal SRAM, which is typically single ported and accessible by both the host processor 14 and the Java processor 16. When the Java processor 16 is executing, the host processor 14 is locked out of both the local data region and the stack. In addition, a data cache is included for fast access to non-local variables, such as arrays.

Figure 2:
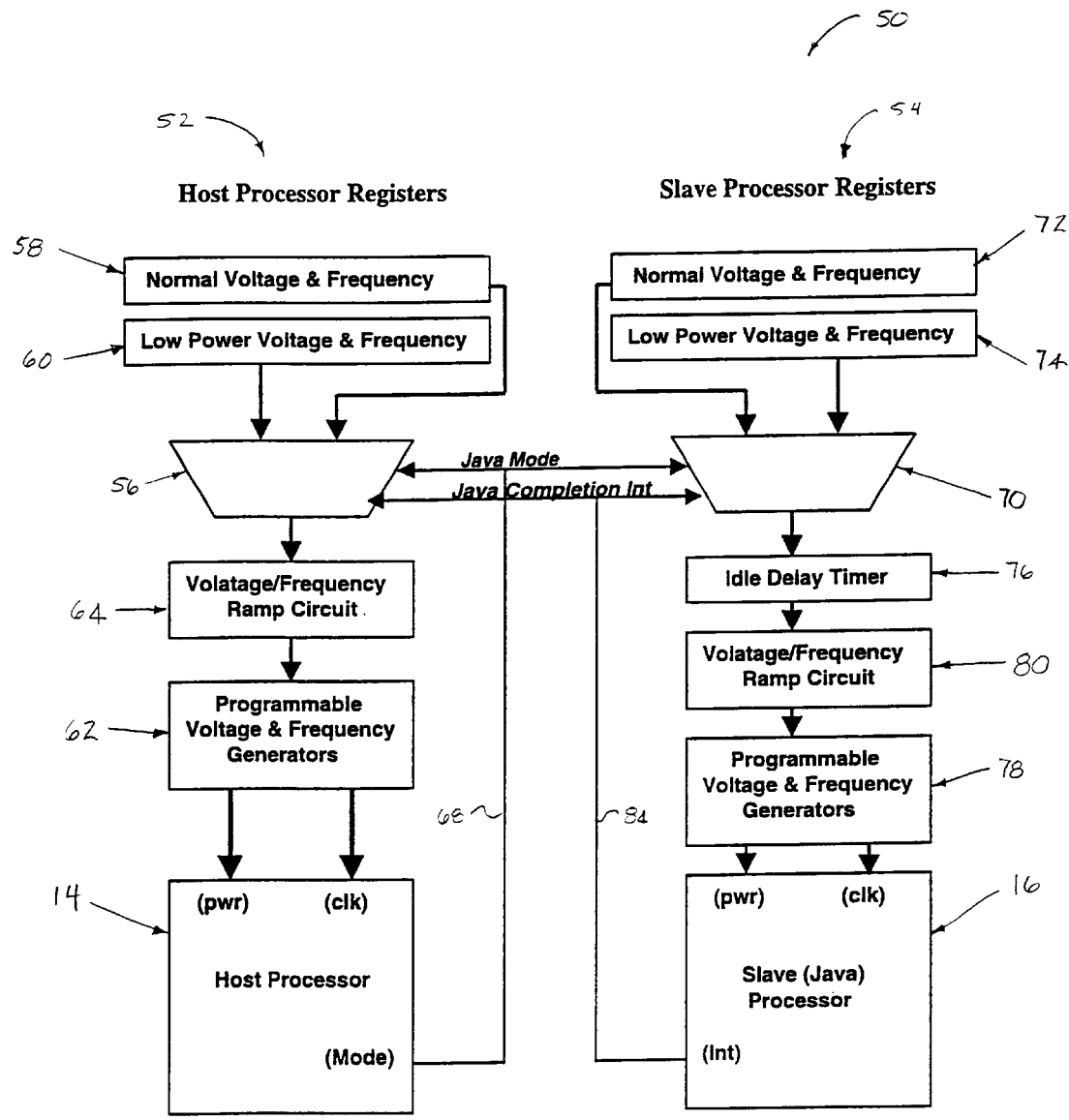
FIG. 2 is a block diagram showing a power management system, in accordance with an embodiment of the present invention.

FIG. 2 is a block diagram showing a power management system 50, in accordance with an embodiment of the present invention. The power management system 50 includes a host processor portion 52 and a Java processor portion 54. The host processor portion 52 includes a host switch register 56 coupled to a set of host normal operating voltage and frequency registers 58, and a set of host low power voltage and frequency registers 60. In addition, the power management system 50 includes a set of programmable voltage and frequency generators 62 coupled to host ramp circuitry 64, and a host processor 14. The host processor 14 includes a Java mode signal port that provides a Java mode signal 68 upon initiation of a Java application.

The Java processor portion 54 includes a Java switch register 70 coupled to a set of Java normal operating voltage and frequency registers 72, a set of Java low power voltage and frequency registers 74, and an idle delay timer 76. In addition, the power management system 50 includes a set of programmable voltage and frequency generators 78 coupled to Java ramp circuitry 80, and a Java processor 16. The Java processor 16 includes a Java completion signal port that provides a Java completion signal 84 when execution of the Java application is halted.

Each of the programmable voltage and frequency generators 62 and 78 provide the actual implantation of the frequency changes provided by the host ramp circuitry 64 and the Java ramp circuitry 80. In operation, each of the programmable voltage and frequency generators 62 and 78 is clocked with a slow clock signal, which allows the appropriate ramp circuitry to provide a new power each clock.

Each processor 14 and 16 has essentially two modes of operation, normal operation mode and low power operation mode. In the normal operation mode, the host processor 14 and the Java processor 16 operate at a voltage and frequency that are generally considered normal for the type of processor in which the host processor 14 or the Java processor 16 is embodied. In the low power operation mode, the host processor 14 and the Java processor 16 operate at a low power voltage and frequency, which is below the normal operating voltage and frequency for the type of processor in which the host processor 14 or the Java processor 16 is embodied.

By using the normal operation mode when a processor 14/16 is performing meaningful work, and then switching to the low power operation mode when the processor 14/16 is not performing meaningful work, the present invention provides enhanced power savings. This power savings is significantly enhanced by the ability to lower both the operating voltage and the operating frequency of each processor 14/16 when it is not in use.

Initially, host processor normal operating voltage and normal operating frequency values are stored in the set of host normal operating voltage and frequency registers 58. In addition, a host processor low power operating voltage value and a host processor low power operating frequency value are stored in the set of host low power voltage and frequency registers 60. Similarly, a Java processor normal operating voltage value and a Java processor normal operating frequency value are stored in the set of Java normal operating voltage and frequency registers 72. A Java processor low power operating voltage value and a Java processor low power operating frequency value are then stored in the set of Java low power voltage and frequency registers 74.

In this manner, the sets of host and Java normal operating voltage and frequency registers 58 and 72 define the normal operating voltages and frequencies for the host processor 14 and the Java processor 16 respectively. Similarly, the sets of host and Java low power voltage and frequency registers 60 and 74 define the low power operating voltages and frequencies for the host processor 14 and the Java processor 16 respectively.

During normal operation, the host processor 14 operates according to its normal operation mode defined by the host normal operating voltage and frequency registers 58, while the Java processor 16 operates according to its low power operation mode defined by the Java low power voltage and frequency registers 74. As discussed previously, the host processor 14 generally executes all non-Java instructions, except for complex Java instructions, such as method calls, that the Java processor does not handle. Upon initiating a Java application, the host processor generates a Java mode signal 68, which informs the power management system 50 that a Java application is to be executed by the Java processor 16. The host register switch 56 and the Java register switch 70 then receive the Java mode signal 68 instructing them to switch operating modes for the host and Java processors 14 and 16.

Upon receiving the Java mode signal 68, the host register switch 56 sets the host target voltage and frequency values for the host processor 14 to the values stored in the host low power voltage and frequency registers 60. Similarly, the Java register switch 70 sets the Java target voltage and frequency values for the Java processor 16 to the values stored in the Java normal operating voltage and frequency registers 72.

At this point, the host ramp circuitry 64 uses the host target voltage and frequency values to gradually reduce the current voltage and frequency of the host processor 14 to the host target voltage and frequency values. In a similar manner, the Java ramp circuitry 80 uses the Java target voltage and frequency values to gradually increase the current voltage and frequency of the Java processor 14 to the Java target voltage and frequency values.

The host and Java ramp circuitry 64 and 80 each provide small incremental voltage and frequency increases or decreases over time until the current voltage and frequency of the host processor and Java processor reach their respective target voltage and frequency values. After each voltage and frequency decrement the host ramp circuitry 64 provides the new decremented voltage and frequency values to the set of programmable voltage and frequency generators 62 coupled to the host processor 14. The set of programmable voltage and frequency generators 62 then set the voltage and frequency of the host processor 14 to the new decremented voltage and frequency values.

Similarly, after each increment the Java ramp circuitry 80 provides the new incremented voltage and frequency values to the set of programmable voltage and frequency generators 78 coupled to the Java processor 16. The set of programmable voltage and frequency generators 78 then set the voltage and frequency of the Java processor 16 to the new incremented voltage and frequency values. In this manner, power is reduced in the host processor 14 and increased in the Java processor 16 when a Java application is initiated, resulting in substantial power savings for system 50.

The Java processor 16 then begins executing the Java application. The Java processor 16 will generally continue to execute the Java application until it is completed, or until a complex Java instruction is encountered that the Java processor 16 cannot handle. At this point, the Java processor 16 generates a Java completion signal 84 or interrupt, which is received by the host register switch 56 and the Java register switch 70, and informs the power management system 50 that execution of the Java application has halted.

Upon receiving the Java completion signal 84, the host register switch 56 sets the host target voltage and frequency values to the values stored in the host normal operating voltage and frequency registers 58. Similarly, the Java register switch 70 sets the Java target voltage and frequency values to the values stored in the Java low power voltage and frequency registers 74.

At this point, the host ramp circuitry 64 uses the host target voltage and frequency values to gradually increase the current voltage and frequency of the host processor 14 to the host target voltage and frequency values. In a similar manner, the Java ramp circuitry 80 uses the Java target voltage and frequency values to gradually reduce the current voltage and frequency of the Java processor 14 to the Java target voltage and frequency values.

As mentioned above, the host and Java ramp circuitry 64 and 80 each provide small incremental voltage and frequency increases or decreases over time until the current voltage and frequency of the host processor and Java processor reach their respective target voltage and frequency values. After each increment the host ramp circuitry 64 provides the new incremented voltage and frequency values to the set of programmable voltage and frequency generators 62 coupled to the host processor 14. The set of programmable voltage and frequency generators 62 then set the voltage and frequency of the host processor 14 to the new incremented voltage and frequency values.

Similarly, after each decrement the Java ramp circuitry 80 provides the new decremented voltage and frequency values to the set of programmable voltage and frequency generators 78 coupled to the Java processor 16. The set of programmable voltage and frequency generators 78 then set the voltage and frequency of the Java processor 16 to the new decremented voltage and frequency values. In this manner, power is increased in the host processor 14 and reduced in the Java processor 16 when execution of a Java application halted. At this point, the host processor 14 resumes control of the system and continues executing computer instructions.

During Java execution, the Java processor 16 stores information in local caches for use in executing the various Java instructions. When Java execution halts, this information is made available to the host processor 14 via the system bus. To provide this information before the Java processor 16 is shut down to low power operation mode, the present invention uses an idle delay timer 76 coupled between the Java register switch 70 and the Java ramp circuitry 80.

The idle delay timer 76 delays the Java voltage ramp circuitry 80 from setting the Java target voltage and frequency values to the lower values stored in the set of Java low power voltage and frequency registers 74. The length of the delay is a function of the size of the cache memory of the Java processor 16, and is set such that the information in the cache can be transferred to the system memory before power to the Java processor 16 is reduced. It should be noted that the idle delay timer 76 preferably only functions when the Java processor 16 generates a Java completion signal 84.

Figure 3:
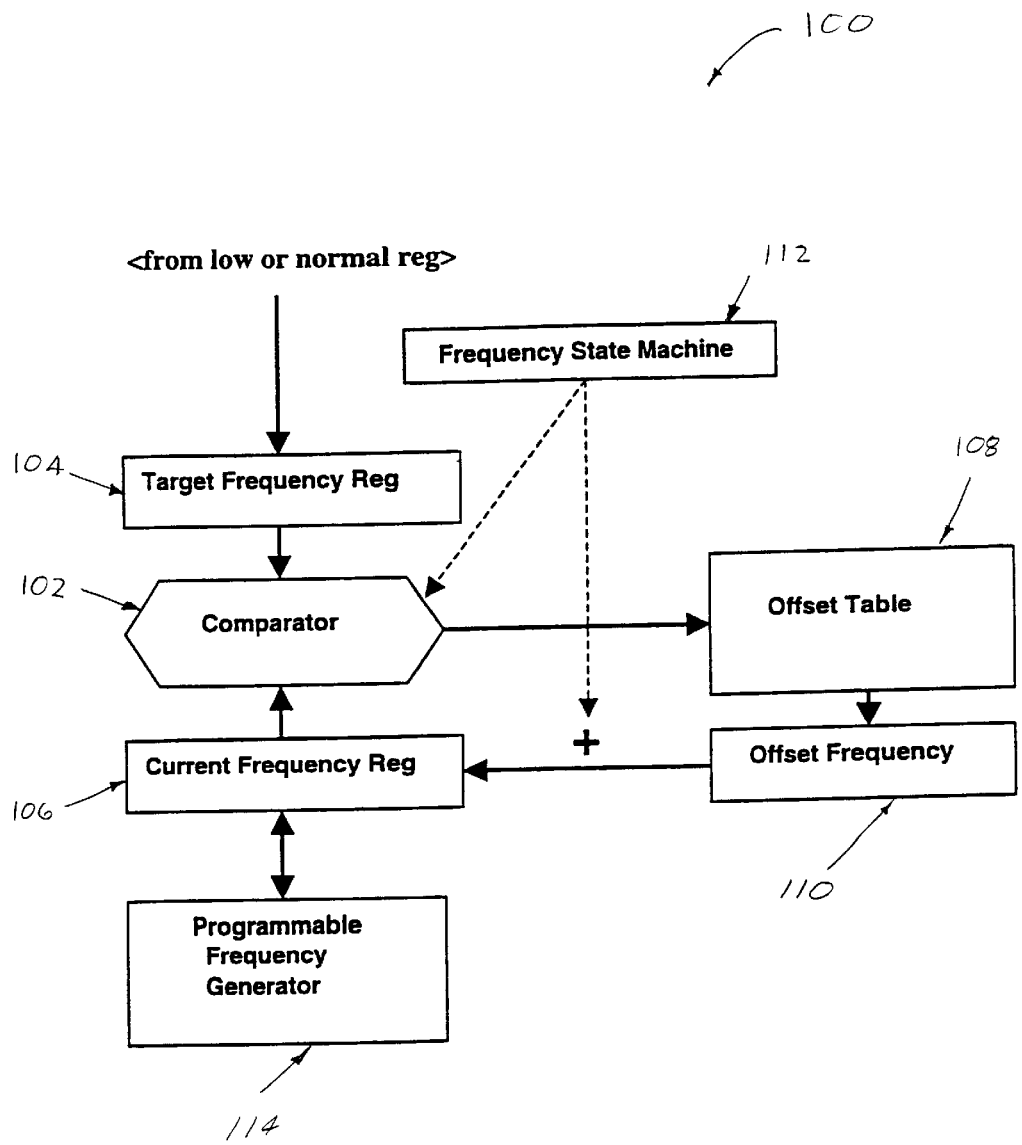
FIG. 3 is a block diagram showing an exemplary ramp circuit, in accordance with an embodiment of the present invention.

FIG. 3 is a block diagram showing an exemplary ramp circuit 100, in accordance with an embodiment of the present invention. The exemplary ramp circuit 100 is shown for use as a frequency ramp circuit, however, the ramp circuit 100 can also be used as a voltage ramp circuit by supplying the registers with voltage values instead of frequency values.

The ramp circuit 100 includes a comparator 102 coupled to a target frequency register 104, a current frequency register 106, and an offset table 108. In addition, the ramp circuit 100 includes an offset frequency register 110 coupled to the offset table 108 and the current frequency register 106. Finally, the ramp circuit 100 includes a frequency state machine 112 that provides control for the ramp circuit 100. It should be noted that the current frequency register 106 is also coupled to a programmable frequency generator 114.

When the power modes are switched between normal operation mode and low power operation mode, the voltage and frequency changes made to both the host and Java processors are preferably dampened in order to prevent stressing the power supply and the digital logic.

As explained in greater detail subsequently, the ramp circuit 100 provides small incremental changes to the voltage and frequency of a processor, and ensures the proper priority of these changes. In particular, when the power to a processor is switched from low power to normal power, the voltage is increased before the frequency is increased. Conversely, when the power to a processor is switched from normal power to low power, the frequency is reduced before the voltage is reduced.

In operation, the ramp circuit 100 is clocked with a relatively slow clock signal provided by the frequency state machine 112. As discussed previously, the ramp circuit 100 obtains a target frequency from either the set of normal operating or low power frequency registers, depending on the current power operation mode, and stores it in the target frequency register 104. The current operating frequency of the related processor is stored in the current frequency register 106.

At each clock signal, the comparator 102 compares the value stored in the target frequency register 104 with the value stored in the current frequency register 106 to obtain a difference value. The difference value is the difference in value between the value stored in the target frequency register 104 and the value stored in the current frequency register 106.

If the difference value is outside a predetermined threshold value, a table lookup is performed using the difference value and the offset table 108. The result of the table lookup is then stored in the offset frequency register 110. The predetermined threshold value can be a range of acceptable frequency values, a single value, or zero. Setting the threshold value at zero results in the difference value being outside the threshold whenever it is not zero. Setting the threshold at a single value represents a range of values between zero and the single value. The difference value is outside a threshold that is range based whenever the difference value is outside the range of values of the threshold.

The value stored in the offset frequency register 110 is then added to, or subtracted from, the value stored in the current frequency register 106, and the result is stored in the current frequency register. Preferably, the offset table is configured to provide frequency offsets that result in the frequency changes being a smooth linear ramp of frequencies. Optionally the offset frequency register 110 can be omitted and the offset value added directly to, or subtracted directly from, the current frequency registered 114 from the offset table 108. The new frequency value stored in the current frequency register 106 is then used to program the programmable frequency generator 114, which sets the frequency of the related processor to the new current frequency value.

The ramp circuit 100 continues the above operations until the difference value is within the predetermined threshold value. At this point, the related processor will be operating at the target frequency and can begin processing appropriate instructions. In another embodiment, the above operations are still continued when the predetermined threshold value is reached. In this embodiment, a zero value is stored in the offset register 110, resulting in no more changes to the current frequency value. Then, when a new target frequency is stored in the target frequency register, the ramp circuit 100 automatically continues operation to ramp the current frequency to the new target value.

As mentioned previously, it should be noted that the ramp circuit 100 can operate as a voltage ramp circuit by changing the frequency values in the ramp circuit 100 to voltage values and connecting the circuit 100 to a programmable voltage generator.

Figure 4:
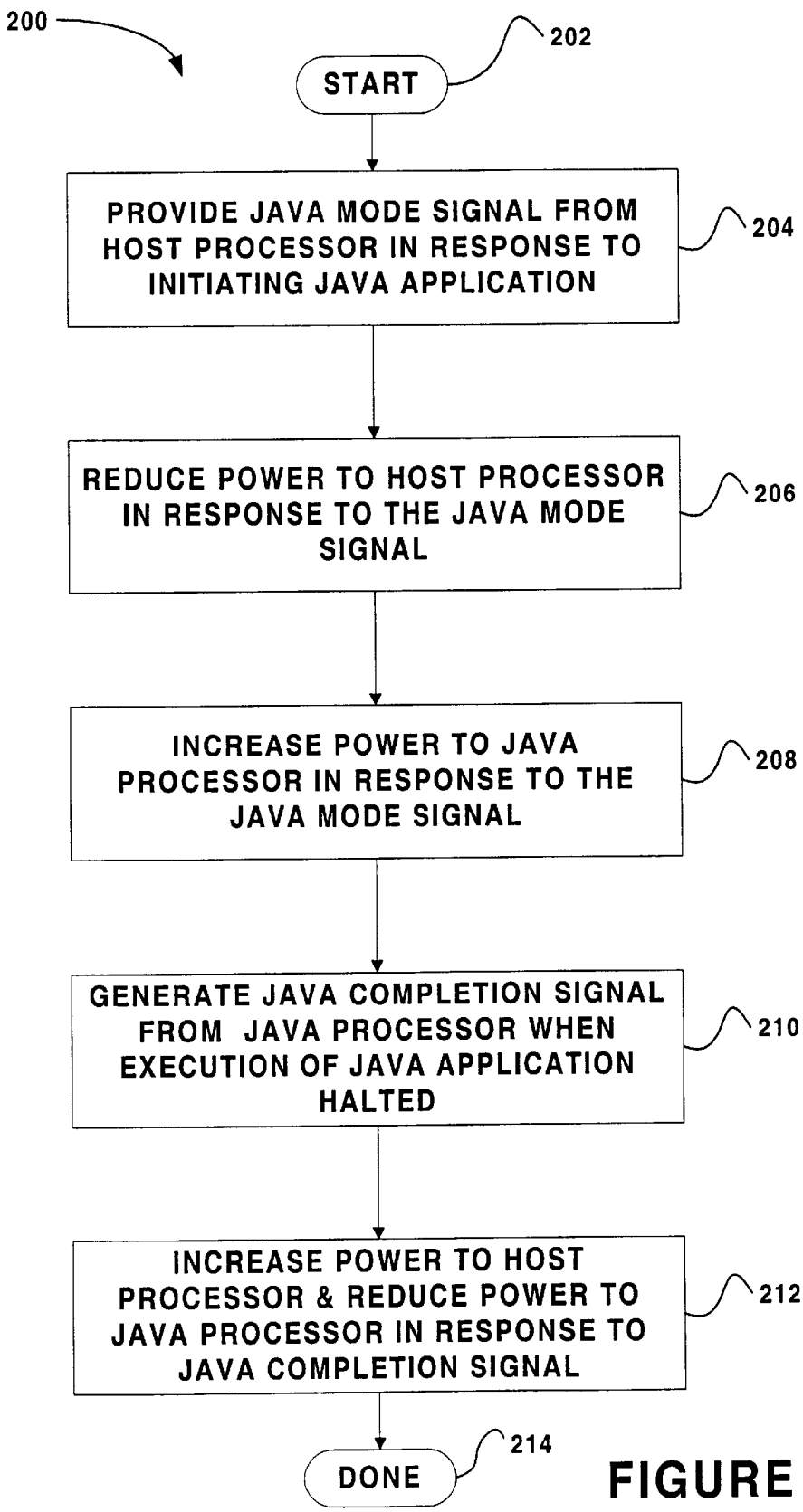
FIG. 4 is a flowchart showing a process for providing power management for a hardware based Java accelerator, in accordance with an embodiment of the present invention.

FIG. 4 is a flowchart showing a process 200 for providing power management for a hardware based Java accelerator, in accordance with an embodiment of the present invention. In an initial operation 202, preprocess operations are performed. Preprocess operations include initializing the Java program counter and stack pointer, and other preprocess operations that will be apparent to those skilled in the art.

In a Java mode operation 204, a Java mode signal is provided from the host processor in response to initiating a Java application. During normal operation, the host processor operates according to its normal operation mode as defined by the host normal operating voltage and frequency registers, while the Java processor operates according to its low power operation mode as defined by the Java low power voltage and frequency registers. The host processor generally executes all non-Java instructions, except for complex Java instructions, such as method calls. Upon initiating a Java application, the host processor generates a Java mode signal, which informs the power management system that a Java application is to be executed by the Java processor. The host register switch and the Java register switch then receive the Java mode signal, which instructs them to switch the operating modes of the host and Java processors.

Next, in a host power reduction operation 206, the power to the host processor is reduced in response to the Java mode signal. Upon receiving the Java mode signal, the host register switch sets the host target voltage and frequency values for the host processor to the values stored in the host low power voltage and frequency registers. The host ramp circuitry then uses the host target voltage and frequency values to gradually reduce the current voltage and frequency of the host processor to the host target voltage and frequency values.

As discussed previously, the host ramp circuitry provides small incremental voltage and frequency increases or decreases over time until the current voltage and frequency of the host processor reaches the target voltage and frequency values. After each voltage and frequency decrement the host ramp circuitry provides the new decremented voltage and frequency values to the set of programmable voltage and frequency generators coupled to the host processor. The set of programmable voltage and frequency generators then set the voltage and frequency of the host processor to the new decremented voltage and frequency values.

In a Java power-increasing operation 208, the power to the Java processor is increased in response to the Java mode signal. Upon receiving the Java mode signal, the Java register switch sets the Java target voltage and frequency values for the Java processor to the values stored in the Java normal operating voltage and frequency registers. The Java ramp circuitry then uses the Java target voltage and frequency values to gradually increase the current voltage and frequency of the Java processor to the Java target voltage and frequency values.

After each voltage and frequency increment the Java ramp circuitry provides the new incremented voltage and frequency values to the set of programmable voltage and frequency generators coupled to the Java processor. The set of programmable voltage and frequency generators then set the voltage and frequency of the Java processor to the new incremented voltage and frequency values. After reaching its normal operating voltage and frequency, the Java processor begins executing the Java application and will generally continue executing the Java application until it is completed, or until a complex Java instruction is encountered that the Java processor cannot handle.

In a Java completion signal operation 210, a Java completion signal is generated from the Java processor when execution of the Java application is halted. At this point, the Java processor generates a Java completion signal or interrupt, which is received by the host register switch and the Java register switch. The Java completion signal informs the power management system that execution of the Java application has halted.

Power to the host processor is then increased and power to the Java processor is reduced in response to the Java completion signal, in a Java completion operation 212. Upon receiving the Java completion signal, the host register switch sets the host target voltage and frequency values to the values provided from the host normal operating voltage and frequency registers. Similarly, the Java register switch sets Java target voltage and frequency values to values provided from the Java low power voltage and frequency registers.

At this point, the host ramp circuitry uses the host target voltage and frequency values to gradually increase the current voltage and frequency of the host processor to the host target voltage and frequency values. In a similar manner, the Java ramp circuitry uses the Java target voltage and frequency values to gradually reduce the current voltage and frequency of the Java processor to the Java target voltage and frequency values.

As mentioned above, the host and Java ramp circuitry each provide small incremental voltage and frequency increases or decreases over time until the current voltage and frequency of the host processor and Java processor reach their respective target voltage and frequency values. After each increment the host ramp circuitry provides the new incremented voltage and frequency values to the set of programmable voltage and frequency generators coupled to the host processor. The set of programmable voltage and frequency generators then set the voltage and frequency of the host processor to the new incremented voltage and frequency values.

Similarly, after each decrement the Java ramp circuitry provides the new decremented voltage and frequency values to the set of programmable voltage and frequency generators coupled to the Java processor. The set of programmable voltage and frequency generators then set the voltage and frequency of the Java processor to the new decremented voltage and frequency values. In this manner, power is increased in the host processor and reduced in the Java processor when execution of a Java application halted. At this point, the host processor resumes control of the system and begins executing computer instructions.

When Java execution halts, information stored in local memory caches is made available to the host processor via the system bus. To provide this information before the Java processor is shut down to low power operation mode, the present invention uses an idle delay timer coupled between the Java register switch and the Java ramp circuitry.

The idle delay timer delays the Java voltage ramp circuitry from setting the Java target voltage and frequency values to the lower values provided from the set of Java low power voltage and frequency registers. The length of the delay is a function of the size of the cache memory of the Java processor, and is set such that the information in the cache can be transferred to the system memory before power to the Java processor is reduced. It should be noted that the idle delay timer preferably only functions when the Java processor generates a Java completion signal.

Post-process operation are then performed in operation 214. Post process operations include execution of Java method calls, and other post-process operations that will be apparent to those skilled in the art. Advantageously, controlling both the operating frequencies and operating voltages of the host and Java processor allows for optimal power and performance in the computer system.

Figure 5:
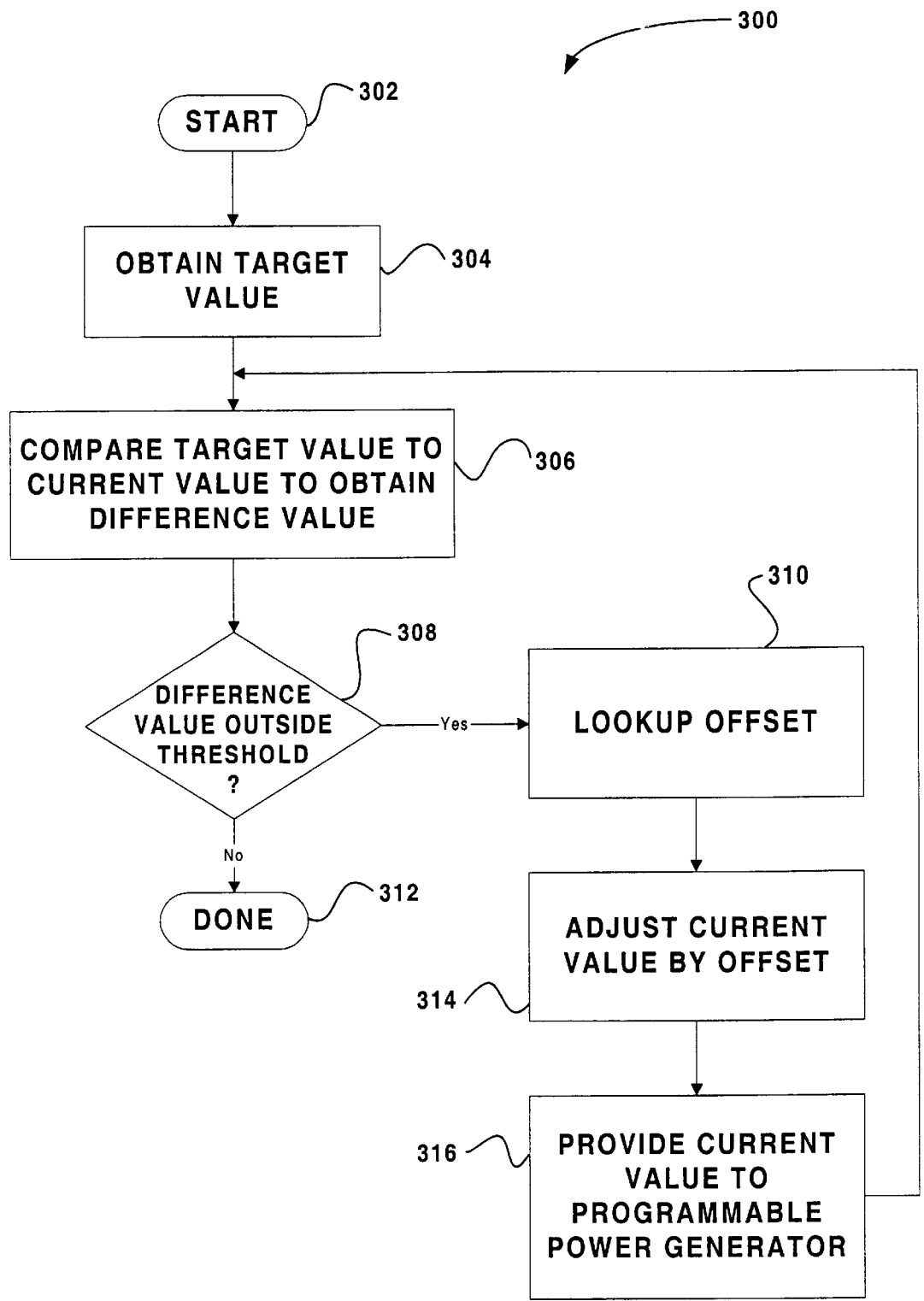
FIG. 5 is flowchart showing a ramp circuit process for dampening changes provided to a processor, in accordance with an embodiment of the present invention.

FIG. 5 is flowchart showing a ramp circuit process 300 for dampening changes provided to a processor, in accordance with an embodiment of the present invention. Although the ramp circuit process 300 will be described as a voltage ramp circuit process, the ramp circuit process 300 can be used for ramping either the frequency or the voltage of a processor. By replacing the following voltage values with frequency values, the ramp circuit process 300 can be used as a frequency ramp circuit process. In an initial operation 302 preprocess operations are performed. Preprocess operations include initializing the normal operating and low power voltage and frequency registers, and other preprocess operations that will be apparent to those skilled in the art.

In a target value operation 304, the target value is obtained from the voltage and frequency registers. A target voltage value is obtained from either the set of normal operating or low power voltage registers, depending on the current power operation mode, and is stored in a target voltage register. The current operating voltage of the related processor is stored in a current voltage register.

Next, in a comparison operation 306, the target value is compared to the current value to obtain a difference value. At each clock signal, a comparator compares the value stored in the target voltage register with the value stored in the current voltage register to obtain a difference value. The difference value is the difference in value between the value stored in the target voltage register and the value stored in the current voltage register.

A decision is then made as to whether the difference value is outside a predefined threshold value, in operation 308. The predetermined threshold value can be a range of acceptable frequency values, a single value, or zero. Setting the threshold value at zero results in the difference value being outside the threshold whenever it is not zero. Setting the threshold at a single value represents a range of values between zero and the single value. The difference value is outside a threshold that is range based whenever the difference value is outside the range of values of the threshold. If the difference value is outside the predefined threshold value, the ramp circuit process 300 continues with a table lookup operation 310. Otherwise, the ramp circuit process 300 is completed in operation 312.

The difference value is used to perform a table lookup in an offset table, in a table lookup operation 310. An offset table is provided that includes a plurality of voltage entries. By looking up the difference value in the offset table, an offset voltage value can be obtained. The resulting offset value from the offset table is then stored in an offset voltage register. Preferably, the offset table is configured to provide voltage offsets that result in the processor voltage changes being a smooth linear ramp of voltages.

In an adjustment operation 314, the current value is adjusted based on the offset voltage obtained in operation 310. The value stored in the offset voltage register is added to, or subtracted from, the value stored in the current voltage register, and the result is stored in the current voltage register. Optionally the offset voltage register can be omitted and the offset value added directly to, or subtracted directly from, the current voltage registered from the offset table.

In a voltage programming operation 316, the new current voltage value is provided to a programmable voltage generator. The new voltage value, which is stored in the current voltage register, is used to program the programmable voltage generator, which sets the voltage of the related processor to the new current voltage value. The ramp circuit process 300 then continues with another comparison operation 304, wherein the current voltage register includes the new adjusted current voltage value.

When the current voltage value is within the predetermined threshold value, the ramp circuit process 300 is completed, in, operation 312. At this point, the related processor will be operating at the target voltage and can begin processing appropriate instructions.

In another embodiment, the ramp circuit process 300 continues with another comparison operation 304 when the predetermined threshold value is reached. In this embodiment, a zero value is stored in the offset register, resulting in no more changes to the current voltage value. When a new target voltage is stored in the target voltage register, the ramp circuit automatically continues operation to ramp the current voltage to the new target value.

The ramp circuit process 300 ensures the proper priority of voltage and frequency changes. In particular, when the power to a processor is switched from low power to normal power, the voltage is increased before the frequency is increased. Conversely, when the power to a processor is switched from normal power to low power, the frequency is reduced before the voltage is reduced.

Advantageously, the ramp circuit process 300 ensures that neither the power supply nor the digital circuitry is stressed during operating condition changes, and ensures adequate time is available between operating condition changes to allow for memory updates between processors.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A power management method for providing power management for a hardware based Java accelerator, the power management method comprising the operations of:

providing a Java mode signal from a host processor in response to initiating a Java application;

reducing power to the host processor in response to the Java mode signal;

increasing power to a Java processor in response to the Java mode signal; and generating a Java completion signal from the Java processor when execution of the Java application halts.

2. A power management method as recited in claim 1, further comprising the operations of:

increasing power to the host processor in response to the Java completion signal; and reducing power to a Java processor in response to the Java completion signal.

3. A power management method as recited in claim 2, wherein power includes voltage and frequency.

4. A power management method as recited in claim 2, wherein the power to the host processor is increased using a ramp circuit process comprising the operations of:

(a) obtaining a target power value;

(b) comparing the target power value to a current power value;

(c) increasing the current power value when the current power value is less than the target power value; and (d) repeating operations (a)–(c) until the current power value is essentially equal to the target power value.

5. A power management method as recited in claim 4, wherein the current power value is increased by an amount obtained from an offset table.

6. A power management method as recited in claim 2, wherein the power to the host processor is reduced using a ramp circuit process comprising the operations of:

(a) obtaining a target power value;

(b) comparing the target power value to a current power value;

(c) reducing the current power value when the current power value is greater than the target power value; and (d) repeating operations (a)–(c) until the current power value is essentially equal to the target power value.

7. A power management method as recited in claim 6, wherein the current power value is reduced by an amount obtained from an offset table.

8. A power management system for providing power management for a hardware based Java accelerator, the power management system comprising:

a host processor coupled to power generation circuitry, the host processor having a Java mode signal port capable of providing a Java mode signal;

a Java processor coupled to the power generation circuitry, the Java processor having a Java completion signal port capable of providing the Java completion signal, wherein the power generator circuitry reduces power to the host processor and increases power to the Java processor in response to receiving the Java mode signal, and wherein the power generator circuitry increases power to the host processor and reduces power to the Java processor in response to receiving the Java completion signal.

9. A power management system as recited in claim 8, wherein the host processor provides the Java mode signal in response to initiating a Java application.

10. A power management system as recited in claim 9, wherein the Java processor provides the Java completion signal when execution of a Java application halts.

11. A power management system as recited in claim 8, wherein the power generation circuitry comprises:

a first set of programmable voltage and frequency generators coupled to the host processor; and a second set of programmable voltage and frequency generators coupled to the Java processor, wherein the first set of programmable voltage and frequency generators are capable of adjusting a voltage and frequency to the host processor, and wherein the second set of programmable voltage and frequency generators are capable of adjusting a voltage and frequency to the Java processor.

12. A power management system as recited in claim 11, further comprising:

host ramp circuitry coupled to the first set of programmable voltage and frequency generators, the host ramp circuitry being capable of providing incremental voltage and frequency changes to the first set of voltage and frequency generators; and Java ramp circuitry coupled to the second set of programmable voltage and frequency generators, the Java ramp circuitry being capable of providing incremental voltage and frequency changes to the second set of voltage and frequency generators, whereby the host ramp circuitry and the Java ramp circuitry dampen voltage and frequency changes provided to the host processor and the Java processor.

13. A power management system as recited in claim 12, wherein the host ramp circuitry and the Java ramp circuitry determine an amount of change to current voltage and frequencies by using offset tables.

14. A power management system as recited in claim 13, wherein normal operating voltage and frequency values and low power voltage and frequency values are stored for the host processor, and wherein normal operating voltage and frequency values and low power voltage and frequency values are stored for the Java processor.

15. A power management system as recited in claim 14, wherein the host ramp circuitry provides incremental voltage and frequency changes within a range of values defined by the normal operating voltage and frequency values and the low power voltage and frequency values for the host processor, and wherein the Java ramp circuitry provides incremental voltage and frequency changes within a range of values defined by the normal operating voltage and frequency values and the low power voltage and frequency values for the Java processor.

16. A ramp circuit method for dampening changes provided to a processor, the ramp circuit method comprising the operations of:

(a) obtaining a target value;

(b) comparing the target value to a current value to obtain a difference value;

(c) adjusting the current value when the difference value is outside a predefined threshold value; and (d) repeating operations (a)–(c) until the difference value is within the predefined threshold value.

17. A ramp circuit method as recited in claim 16, further comprising the operations of:

determining an offset value from an offset table using the difference value;

adjusting the current value by an amount defined by the offset value.

18. A ramp circuit method as recited in claim 17, further comprising the operation of providing the current value to programmable power generation circuitry that determines current operating conditions for a processor.

19. A ramp circuit method as recited in claim 16, wherein the target value and the current value are voltage values.

20. A ramp circuit method as recited in claim 16, wherein the target value and the current value are frequency values.

* * * * *